United States Patent [19]
Thornburgh et al.

[11] Patent Number: 4,735,640
[45] Date of Patent: Apr. 5, 1988

[54] AIR CLEANER LIQUID DRAIN AND FILTER ASSEMBLY

[75] Inventors: William F. Thornburgh, Rochester Hills; Ronald L. Strnad, Flushing, both of Mich.

[73] Assignee: General Motors Corporation, Detroit, Mich.

[21] Appl. No.: 59,013

[22] Filed: Jun. 8, 1987

[51] Int. Cl.⁴ ............................................. B01D 46/10
[52] U.S. Cl. ....................................... 55/315; 55/350; 55/432; 55/510; 123/198 E
[58] Field of Search ................. 55/315, 350, 425, 431, 55/432, 510, DIG. 15; 123/198 E

[56] References Cited
U.S. PATENT DOCUMENTS 4,388,091  6/1983  Khosvopouv .................. 55/432 X
4,494,575  1/1985  Gladstone ........................ 55/432 X Primary Examiner—Charles Hart
Attorney, Agent, or Firm—R. L. Phillips

[57] ABSTRACT

An air cleaner has a casing having an air inlet and an air outlet with an air filter therebetween. A sump with a drain hole is formed in the casing between the filter and outlet. A valve opens the drain hole to drain the sump in response to the collection of a predetermined amount of liquid thereabove in the sump collected from air passing from the filter to the outlet. And an air filter filters any air passing through the drain hole from outside the casing should the valve open while air is passing from the normal inlet to the outlet.

3 Claims, 1 Drawing Sheet

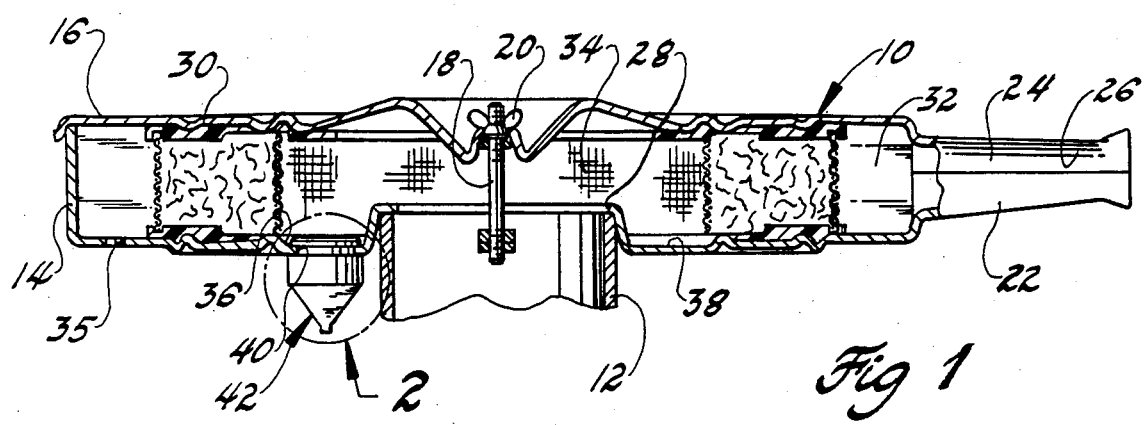
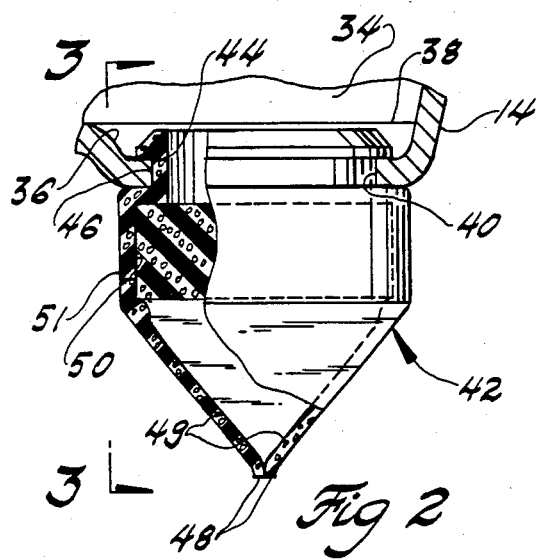
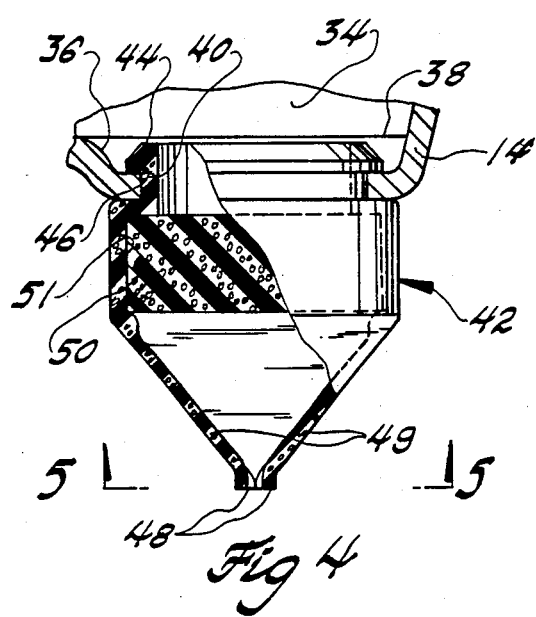
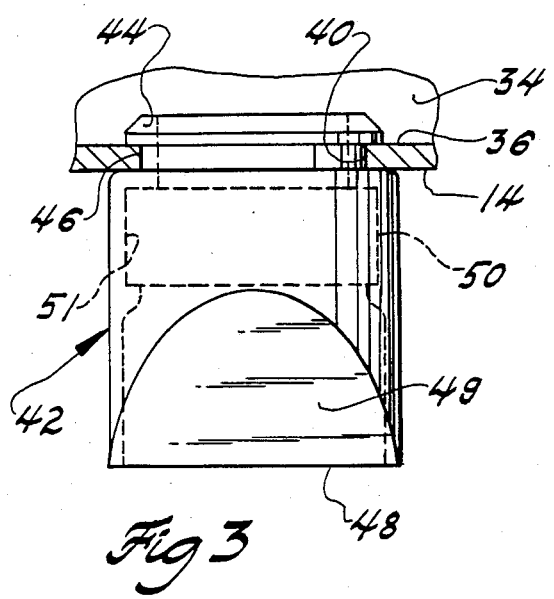
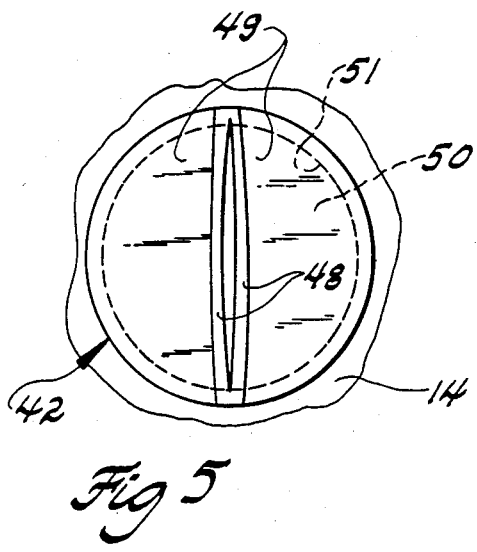

AIR CLEANER LIQUID DRAIN AND FILTER ASSEMBLY

TECHNICAL FIELD

This invention relates to air cleaners and more particularly to draining the liquid trapped in the air cleaner of an internal combustion engine.

BACKGROUND OF THE INVENTION

In conventional air cleaners such as used on the internal combustion engines in passenger cars and trucks, it is common practice to provide one or more drain holes in the air cleaner casing between the air inlet and the upstream side of the air filter. The purpose of these holes is to drain any liquid collected on the bottom of the cleaner casing from the air passing through the filter and onto the engine. Such drainage holes are located upstream of the air filter since outside air can also enter through these drain holes. While this drainage arrangement has proven generally satisfactory, there are air cleaner casing designs where liquid can also collect on the downstream side of the air filter. Without drainage of this liquid, it could eventually be picked up by the filtered air and drawn into the engine which is, of course, undesirable.

SUMMARY OF THE INVENTION

The present invention is directed to providing drainage of any liquid that might be collected in the air cleaner casing on the downstream side of the air filter while preventing entry of any unfiltered outside air. This is accomplished by providing a sump with a drain hole in the air cleaner casing between the downstream side of the filter and the air outlet and incorporating a valve that opens this drain hole to drain the sump in response to the collection of a predetermined amount of liquid therein. In addition, an air filter is provided in the valve for filtering any outside air passing from outside the casing through the drain hole should the valve open while air is passing from the normal inlet to the outlet. Preferably, the valve is of the elastomeric duck bill type which is normally closed and because of its elasticity can be designed to open in response to the weight of the liquid collected thereabove in the sump.

These and other objects, advantages and features of the present invention will become more apparent from the following description and drawing in which:

FIG. 1 is a cross-sectional view of an air cleaner assembly mounted on a carburetor of a motor vehicle's internal combustion engine and embodying the preferred form of the liquid drain and filter arrangement of the present invention.

FIG. 2 is an enlarged view of the drain valve in FIG. 1 in its normally closed condition.

FIG. 3 is a view taken along the line 4—4 in FIG. 2.

FIG. 4 is a view similar to FIG. 2 but showing the valve open.

FIG. 5 is a view taken along the line 5—5 in FIG. 3.

Referring to FIG. 1, there is shown an air cleaner 10 for a motor vehicle internal combustion engine of which only the inlet 12 of the engine's carburetor is shown. The air cleaner has a casing comprising a circular pan-shaped bottom 14 and a circular lid 16 which are clamped together and to the carburetor 12 by a stud 18 and wing nut 20. The bottom and lid have partial funnel-shaped portions 22 and 24 that extend from their periphery and cooperatively form a snarkle 26 providing an air inlet to the casing. A central aperture 28 in the pan forms an outlet from the casing to the inlet 12 of the carburetor. An annular air filter assembly 30 is mounted concentrically in the casing and is clamped thereby so as to be sealingly positioned between the air inlet 26 and the air outlet 28 and leave an annular unfiltered air chamber 32 open to the inlet surrounding the air filter and a centrally located filtered air chamber 34 open to the outlet. A drain hole 35 formed in the pan 14 at the bottom of the unfiltered air chamber 32 is for draining any liquid collected on the upstream side of the filter 30.

The structure thus far described is conventional but now according to the present invention a depression 36 formed in the pan 14 at the bottom 38 of the filtered air chamber 34 provides a sump to collect liquid, i.e. water, borne by the clean air passing from the filter 30 to the outlet 28 and this sump is drained by a circular drain hole 40 formed in the bottom of the sump 36 having an elastomeric one-piece duck bill type one-way drain valve 42 mounted therein. The valve 42 is retained in the drain hole by the formation of an integral grommet section 44 at its upper end having an annular groove 46 which receives the edge of the drain hole 40 as seen in FIG. 2. The valve 42 at its lower end has lips 48 which are normally closed as shown in FIG. 2 to thus close the drain hole.

The durometer and thickness of the walls 49 of the lips of the valve are selected so that the valve is responsive to open the drain hole as shown in FIGS. 4 and 5 to drain the sump in response to the collection of a predetermined amount of liquid in the sump above the valve. For example, their selection may be such that the valve is opened by the weight of five cubic centimeters of water.

A disk-shaped air filter 50 is mounted in a cylindrical section 51, the valve 42 for filtering any air passing through the drain hole from outside the casing should the valve open while air is passing from the normal inlet 26 to the outlet 28, i.e. during engine operation. Thus, should the drain valve open during engine operation, dirt is prevented from entering through the drain hole in the air cleaner into the engine. And thus it will be appreciated that the combination drain and filter assembly on the air cleaner is effective to allow one-way flow of liquid to the outside yet prevent any possible entry of dirt into the engine.

The above described preferred embodiment is illustrative of the invention which may be modified within the scope of the appended claims.

The embodiments of the invention in which an exclusive property or privilege is claimed are defined as follows:

1. An air cleaner comprising a casing having an air inlet and an air outlet and a sump therebetween with a drain hole, an air filter mounted in said casing between said air inlet and said sump, valve means for opening said drain hole to drain said sump in response to the collection of a predetermined amount of liquid thereabove in said sump collected from air passing from said filter to said outlet, and an air filter operable to filter any air passing through said drain hole from outside said casing should said valve means open while air is passing from said inlet to said outlet.

2. An air cleaner comprising a casing having an air inlet and an air outlet and a sump therebetween with a drain hole, an air filter mounted in said casing between said air inlet and said sump, an elastomeric duck-bill type one-way valve operable to open said drain hole to drain said sump in response to the collection of a predetermined amount of liquid thereabove in said sump collected from air passing from said filter to said outlet, and an air filter operable to filter any air passing through said drain hole from outside said casing should said valve open while air is passing from said inlet to said outlet.

3. An air cleaner comprising a casing having an air inlet and an air outlet and a sump therebetween with a drain hole, an air filter mounted in said casing between said air inlet and said sump, an elastomeric duck-bill type one-way valve mounted by an integral grommet section in said drain hole and operable to open said drain hole to drain said sump in response to the collection of a predetermined amount of liquid thereabove in said sump collected from air passing from said filter to said outlet, and an air filter mounted in said valve operable to filter any air passing through said drain hole from outside said casing should said valve open while air is passing from said inlet to said outlet.

* * * * *